US010865734B2

(12) United States Patent
Donahue et al.

(10) Patent No.: US 10,865,734 B2
(45) Date of Patent: Dec. 15, 2020

(54) PISTON ASSEMBLY WITH OFFSET TIGHT LAND PROFILE

(71) Applicant: AI ALPINE US BIDCO INC., Wilmington, DE (US)

(72) Inventors: Richard John Donahue, West Bend, WI (US); Lorne Eugene Nix, Waukesha, WI (US); Kenneth Edward Neuman, Waukesha, WI (US)

(73) Assignee: AI ALPINE US BIDCO INC, Wilmington, DE (US)

(*) Notice: Subject to any disclaimer, the term of this patent is extended or adjusted under 35 U.S.C. 154(b) by 200 days.

(21) Appl. No.: 15/833,465

(22) Filed: Dec. 6, 2017

(65) Prior Publication Data
US 2019/0170084 A1    Jun. 6, 2019

(51) Int. Cl.
*F02F 3/00* (2006.01)
*F02F 3/26* (2006.01)
*F02F 3/28* (2006.01)
*F02B 23/06* (2006.01)

(52) U.S. Cl.
CPC .............. *F02F 3/26* (2013.01); *F02B 23/069* (2013.01); *F02F 3/28* (2013.01)

(58) Field of Classification Search
CPC ......... F02F 3/28; F02F 1/183; F02B 23/0672; F02B 23/069
USPC ..................................................... 123/193.6
See application file for complete search history.

(56) References Cited

U.S. PATENT DOCUMENTS

| 2,219,798 | A | * | 10/1940 | Wherry ................ F16J 1/06 92/126 |
| 3,626,815 | A | | 12/1971 | Fingeroot et al. |
| 3,971,355 | A | | 7/1976 | Kottman |
| 3,985,475 | A | | 10/1976 | Gatecliff |
| 4,000,723 | A | | 1/1977 | Boyesen |
| 4,185,544 | A | | 1/1980 | Kolar |
| 4,286,505 | A | | 9/1981 | Amdall |
| 4,367,702 | A | * | 1/1983 | Lassanske ............ F16J 9/00 123/182.1 |
| 4,428,229 | A | | 1/1984 | Storwick |
| 4,489,687 | A | | 12/1984 | Bailey et al. |
| 4,494,489 | A | | 1/1985 | Seidl |
| 4,522,173 | A | | 6/1985 | Agache |
| 4,688,774 | A | | 8/1987 | Warmuth, II |
| 4,811,654 | A | | 3/1989 | Rosch |
| 4,893,592 | A | | 1/1990 | Falero |
| 4,991,664 | A | | 2/1991 | Kolgan et al. |
| 5,050,617 | A | | 9/1991 | Columbus et al. |

(Continued)

FOREIGN PATENT DOCUMENTS

EP    0076561 A1    4/1983
EP    0027445 B1    7/1983

(Continued)

*Primary Examiner* — Long T Tran
*Assistant Examiner* — James J Kim
(74) *Attorney, Agent, or Firm* — Fletcher Yoder, P.C.

(57) ABSTRACT

The present application provides a piston assembly. The piston assembly may include a cylinder bore extending from a thrust side to an antithrust side and a piston positioned within the cylinder bore. The piston may include a top land, a second land, and a skirt with an axis extending therethrough. The piston may include a tight land profile with an offset about the axis of the skirt.

18 Claims, 2 Drawing Sheets

(56) References Cited

U.S. PATENT DOCUMENTS

| | | | |
|---|---|---|---|
| 5,058,489 A * | 10/1991 | Iwaya | F02F 1/183 92/232 |
| 5,072,653 A * | 12/1991 | Parsons | F02F 3/00 123/193.6 |
| 5,072,654 A | 12/1991 | MacGregor | |
| 5,112,145 A | 5/1992 | MacGregor | |
| 5,117,742 A * | 6/1992 | Iida | F04B 39/0005 277/445 |
| 5,179,916 A | 1/1993 | Schonfeld | |
| 5,211,101 A * | 5/1993 | Letsch | F02F 3/0069 92/177 |
| 5,239,955 A * | 8/1993 | Rao | F02B 77/02 123/193.4 |
| 5,245,752 A | 9/1993 | Lippai et al. | |
| 5,245,913 A * | 9/1993 | Kato | F02F 3/00 123/193.6 |
| 5,261,321 A * | 11/1993 | Whitacre | F02F 1/183 92/177 |
| 5,476,076 A * | 12/1995 | Zhou | F02F 3/022 123/193.4 |
| 5,544,627 A * | 8/1996 | Terziev | F02F 7/0019 123/197.3 |
| 5,758,609 A | 6/1998 | Smith | |
| 5,901,678 A * | 5/1999 | Bielaga | F16J 1/02 123/193.6 |
| 5,970,946 A | 10/1999 | Shea et al. | |
| 6,142,123 A | 11/2000 | Galasso et al. | |
| 6,860,190 B2 | 3/2005 | Oversby et al. | |
| 7,293,497 B2 | 11/2007 | Donahue | |
| 7,506,575 B2 | 3/2009 | Donahue | |
| 7,685,710 B2 | 3/2010 | Scharp | |
| 8,499,730 B2 | 8/2013 | Yasutomi et al. | |
| 8,757,126 B2 | 6/2014 | Sullivan, IV | |
| 8,763,584 B2 | 7/2014 | Foege | |
| 8,807,109 B2 | 8/2014 | Muscas et al. | |
| 9,200,589 B1 | 12/2015 | Donahue | |
| 9,242,317 B2 | 1/2016 | Scharp et al. | |
| 9,273,628 B2 * | 3/2016 | Golya | F02F 3/02 |
| 9,316,101 B2 | 4/2016 | Nguyen et al. | |
| 9,334,830 B2 | 5/2016 | Donahue | |
| 9,359,971 B2 | 6/2016 | Donahue et al. | |
| 9,470,179 B2 | 10/2016 | Donahue et al. | |
| 9,534,559 B2 | 1/2017 | Donahue | |
| 9,850,890 B2 | 12/2017 | Lim et al. | |
| 10,030,604 B2 * | 7/2018 | Montgomery | F02P 15/001 |
| 2007/0256650 A1 | 11/2007 | Ethelmer Pflughoeft | |
| 2008/0295683 A1 | 12/2008 | Wagner | |
| 2008/0314353 A1 * | 12/2008 | Highum | B22D 19/0081 123/193.2 |
| 2012/0037112 A1 | 2/2012 | Muscas | |
| 2013/0186365 A1 | 7/2013 | Laimboeck | |
| 2014/0119965 A1 | 5/2014 | Gabdullin | |
| 2014/0261335 A1 | 9/2014 | Trentham | |
| 2015/0176524 A1 | 6/2015 | Linke | |
| 2015/0198113 A1 | 7/2015 | Donahue | |
| 2015/0226151 A1 | 8/2015 | Emmerich et al. | |
| 2015/0285181 A1 | 10/2015 | Hillebrecht et al. | |
| 2016/0032862 A1 | 2/2016 | Donahue et al. | |
| 2016/0040622 A1 | 2/2016 | Donahue | |
| 2016/0040780 A1 | 2/2016 | Donahue | |
| 2016/0153442 A1 | 6/2016 | Lim et al. | |
| 2016/0201597 A1 | 7/2016 | Donahue et al. | |
| 2017/0030290 A1 | 2/2017 | Donahue et al. | |
| 2017/0057023 A1 | 3/2017 | Sharp et al. | |
| 2017/0082058 A1 | 3/2017 | Katakura et al. | |
| 2017/0082059 A1 | 3/2017 | Ando et al. | |
| 2017/0089293 A1 | 3/2017 | Donahue et al. | |
| 2017/0114826 A1 | 4/2017 | Pienta | |

FOREIGN PATENT DOCUMENTS

| | | |
|---|---|---|
| EP | 0881372 B1 | 3/2001 |
| EP | 0902180 B1 | 11/2002 |
| EP | 1092849 B1 | 6/2006 |
| EP | 1092848 B1 | 12/2006 |
| EP | 2628917 A1 | 8/2013 |
| EP | 3070332 A1 | 9/2016 |
| WO | 1993/008390 A1 | 4/1993 |
| WO | 2001/011212 A1 | 2/2001 |
| WO | 2005/046928 A1 | 5/2005 |
| WO | 2012/143075 A1 | 10/2012 |
| WO | 2014/079407 A1 | 5/2014 |
| WO | 2014/121874 A1 | 8/2014 |
| WO | 2015/192816 A1 | 12/2015 |

* cited by examiner

PISTON ASSEMBLY WITH OFFSET TIGHT LAND PROFILE

TECHNICAL FIELD

The present application and the resultant patent relate generally to pistons for internal combustion engines and more particularly relate to a pistons with an offset tight land profile about the top land and/or the second land so as to minimize wear and carbon deposits while meeting overall emissions targets.

BACKGROUND OF THE INVENTION

Internal combustion engines typically include a piston disposed inside a cylinder that may be provided with a cylinder liner. Piston rings that fit into a groove on the outer diameter of the piston are typically provided. The main task of the piston is to convert thermal energy into mechanical work. The piston may include a piston head, a top land, a second land, a shaft, and a skirt. The piston rings seal the combustion chamber from the crankcase and distribute and control the oil. The piston rings also stabilize the piston.

In the operation of internal combustion engines, it is common to see a decrease in power resulting from unburned fuel trapped within the top land height by the clearance formed between the top land and the cylinder liner (or the cylinder bore where there is no cylinder liner). The term crevice volume may be used herein for the purpose of describing this clearance volume where unburned fuel may be trapped. This unburned fuel reduces engine efficiency and increases total hydrocarbon emissions. One approach to reduce the top land crevice volume is the implementation of a reduced top land height. However, reduced top land heights may increase top ring groove temperatures and cause ring groove deposits.

The buildup of carbon deposits in the top land of a piston also may cause wear (polishing) of cylinder liners and carbon raking (vertical lines formed on the liner wall caused by carbon being raked down the liner). Such wear may result in the need to replace the cylinder liners. The wear also may result in increased maintenance and spare parts costs. Carbon deposit buildups also may affect performance of the internal combustion engine, including a reduction in output and efficiency and an increase in oil consumption.

One approach for dealing with carbon deposits is the implementation of a tight land profile. In a tight land profile, the clearance between the land and the cylinder liner may be reduced. The tight land profile controls the fundamental factors which drive deposits, namely temperature and residence time. Piston temperatures may be reduced with a tight land profile because heat conduction out of the piston to the cylinder bore has been enabled and because the heat flux into the land has been reduced. With reduced temperatures, deposits are less likely to form. Another reason for the cleanliness of the tight land profile is because the oil which is on the land and in the ring groove is being constantly replenished with a fresh supply of oil between the land and the liner due to the tight clearances. With this replenishment, the residence time of the oil on the land and in the ring groove is reduced, and with reduced residence time, deposits also may be reduced.

SUMMARY OF THE INVENTION

The present application and the resultant patent thus provide a piston assembly for a power generation system. The piston assembly may include a cylinder bore extending from a thrust side to an antithrust side and a piston positioned within the cylinder bore. The piston may include a top land, a second land, and a skirt with an axis extending therethrough. The piston may include a tight land profile with an offset about the axis of the skirt.

The present application and the resultant patent further provide a piston assembly for a power generation system. The piston assembly may include a cylinder liner extending from a thrust side to an antithrust side and a piston positioned within the cylinder liner. The piston may include a top land and a second land and with the top land and/or the second land including an offset towards the thrust side or the antithrust side.

These and other features and improvement of the present application and the resultant patent will become apparent to one of ordinary skill in the art upon review of the following detailed description when taken in conjunction with the several drawings and the appended claims.

BRIEF DESCRIPTION OF THE DRAWINGS

FIGS. 2 and 3 are schematic side view and top view diagrams, respectively, of a piston assembly as may be described herein for use in the engine-based drive system of FIG. 1 and the like.

DETAILED DESCRIPTION

Figure 1:
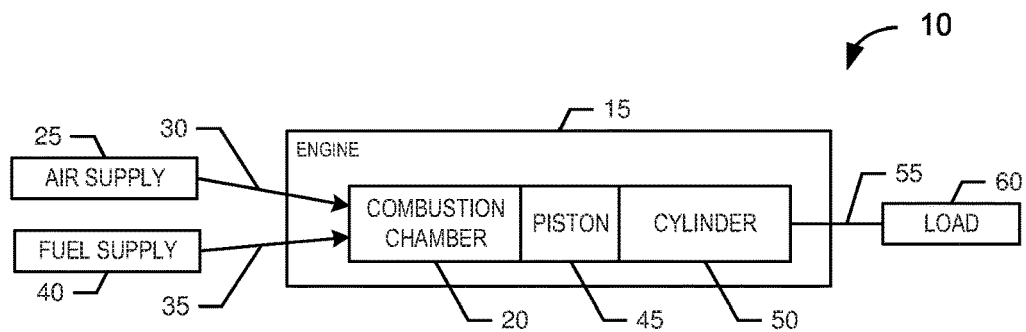
FIG. 1 is a schematic diagram of an example of an engine-based drive system.

Turning now to the drawings, in which like numerals reflect like elements through the several views, FIG. 1 is a schematic diagram of a portion of an engine-based drive system 10. As described in detail below, the power generation system 10 includes an engine 15 (e.g., a reciprocating internal combustion engine) having one or more combustion chambers 20. An air supply 25 is configured to provide a pressurized oxidant 30, such as air, oxygen, oxygen-enriched air, oxygen-reduced air, or any combination thereof, to each combustion chamber 20. The combustion chamber 20 is also configured to receive a fuel 35 (e.g., liquid and/or gaseous fuel) from a fuel supply 40, and to ignite a fuel-air mixture for combustion within each combustion chamber 20. The hot pressurized combustion gases cause a piston 45 adjacent to each combustion chamber 20 to move linearly within a cylinder 50 and convert pressure exerted by the combustion gases into a rotating motion, which causes a shaft 55 to rotate. Together, the piston 45 and the cylinder 50 may form a power cylinder system for the engine 10. The shaft 55 may be coupled to a load 60, which is powered via rotation of the shaft 55. For example, the load 60 may be any suitable device that may generate power via the rotational output of the engine 15, such as an electrical generator and the like. Other types of loads may include driving gas compressors, mechanical drives, and the like. Exemplary engines 15 may include Jenbacher Engines (e.g., Jenbacher Type 2, Type 3, Type 4, Type 6, or J920 FleXtra) or Waukesha Engines (e.g., Waukesha VGF, VHP, 275GL), for example, provided by General Electric Company of Schenectady, N.Y. and the like. Other types of engines may be used herein.

Figure 2:
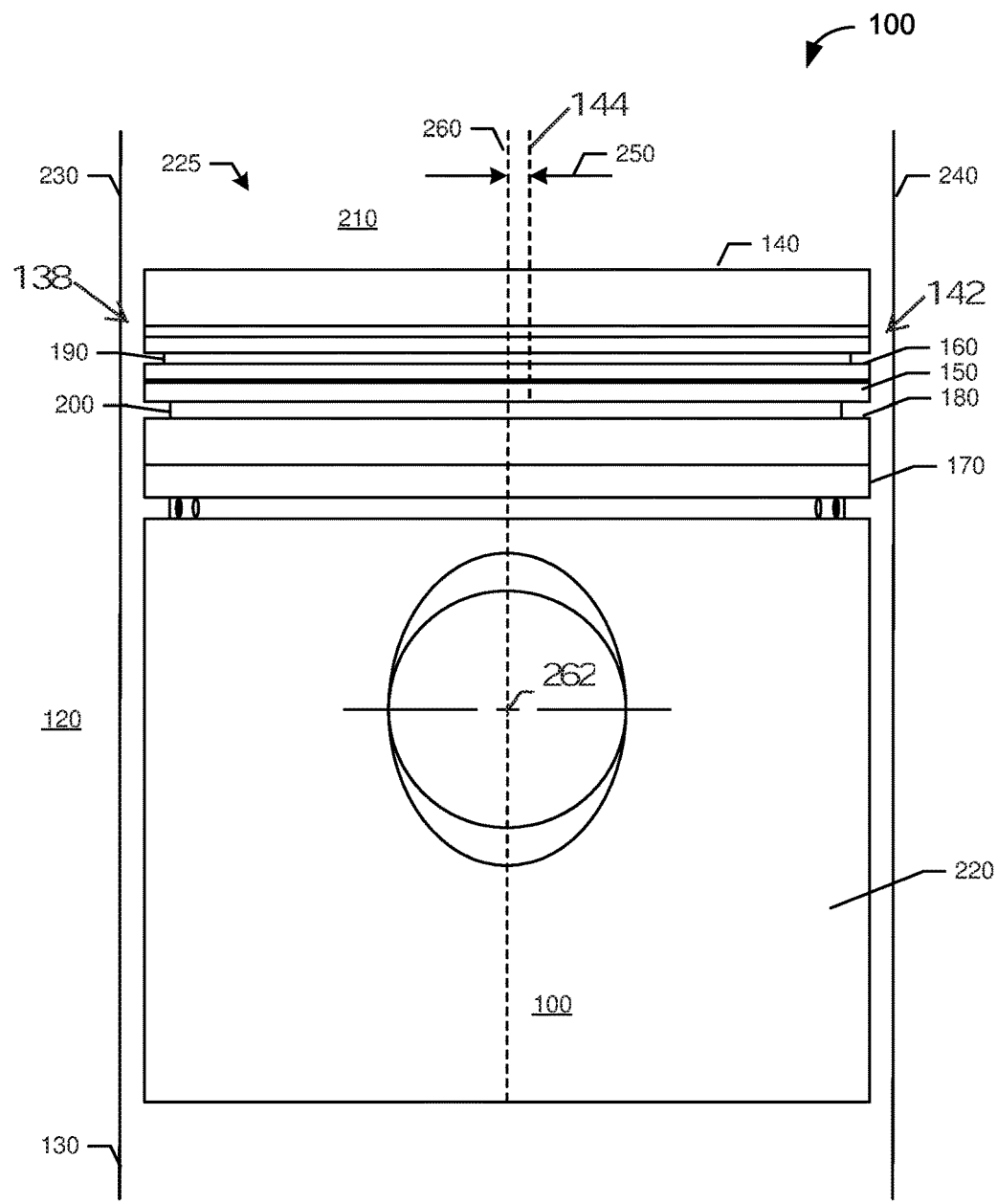

FIG. 2 shows an example of a piston assembly 100 as may be described here for use in a power generation system or other type of drive system. The piston assembly 100 includes a piston 110, a cylinder bore 120, and may include a cylinder liner 130. The cylinder bore 120 and the cylinder liner 130 may define an axis along which the piston 110 travels in a reciprocating fashion. The piston 110 may include a first or a top land 140, a second land 150 that defines a top ring groove 160 therebetween, and a third land 170 that defines a second ring groove 180 therebetween. A top ring may be disposed in the top ring groove 160 and a second ring may be disposed in the second ring groove 180. The top ring helps to stabilize the piston 110 in the cylinder liner 130 and also may prevent the passage of oil into a firing chamber 210. The top ring is the primary seal of the combustion gases from escaping therethrough. A skirt portion 220 extends below the third land 170. Other components and other configurations may be used herein.

Figure 3:
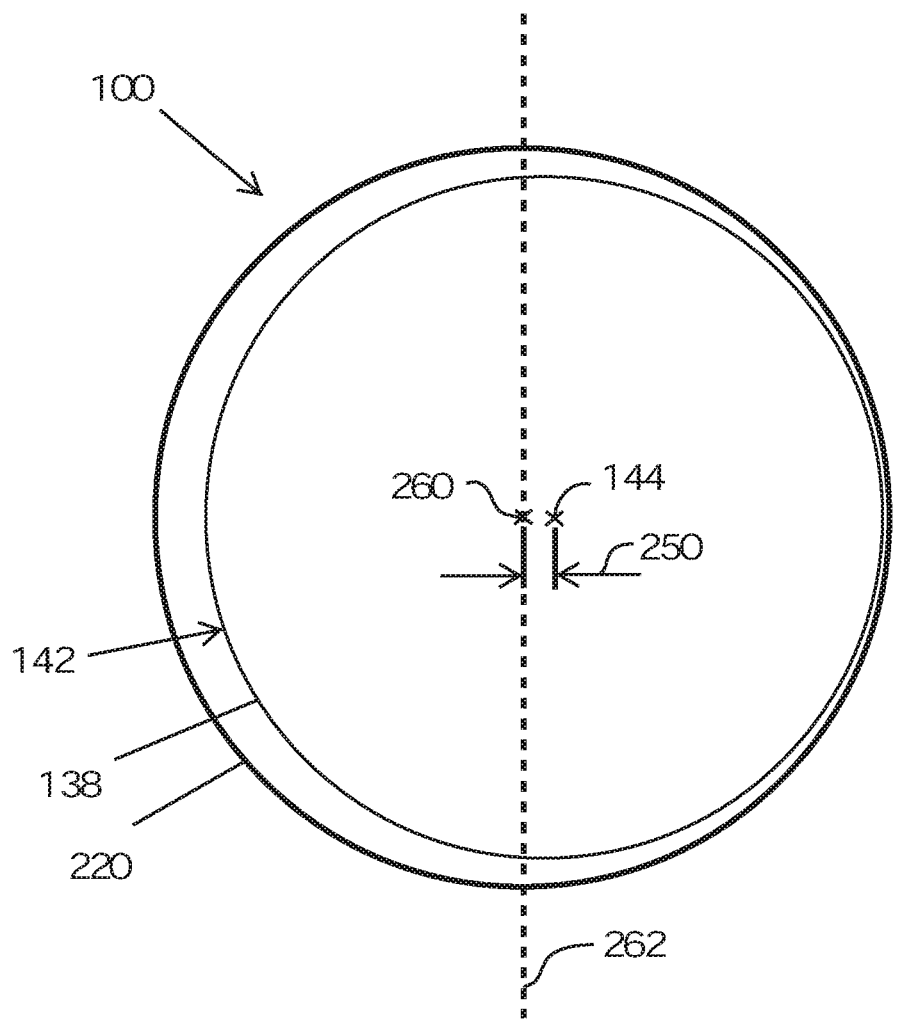

The piston 110 and cylinder liner 130 may form a tight land profile 225. The tight land profile 225 may extend from a thrust side 230 to an antithrust side 240. A tight land profile 225 is a configuration where the clearance between the top land 140 and/or the second land 150 and the cylinder liner 130 (or the cylinder bore 120 where there is no cylinder liner 130) is reduced to limit the amount of unburned hydrocarbon emissions generated in the firing chamber 210. The top land 140 and/or the second land 150 (i.e., lands 138) of the piston 110 may be defined as having a summation of orders of ovality. Specifically, the top land 140 and/or the second land 150 (i.e., lands 138) may be defined herein as an ellipse 142 (see FIG. 3) as the summation of orders of ovalities 0, 1, and 2 with an offset 250 represented by the first (1st) order ovality. The offset 250 may be, but is not limited to, directed towards either the thrust side 230 or the antithrust side 240. The exact direction of the offset 250 may depend on the cumulative clearance of the assembly based on assembly loads, thermal deformations, secondary motion, and the like. The offset 250 extends from an axis 260 of the skirt portion 220, which axis 260 aligns with a pin axis 262 in the skirt portion 220. The ellipse 142 has an ellipse axis 144, such that the ellipse axis 144 is offset 250 from the axis 260 of the skirt portion 220, as illustrated in FIGS. 2 and 3. The ellipse 142 may include a true circle shape. The axis 260 of the skirt portion 220 shall be based on the center as defined by the Minimum Circumscribed Circle (MCC). This center is that of the smallest circle which will just contain the measured profile. This is also known as the ring gage center and is generally used for external diameters. For symmetric profiles, an acceptable alternate method to define center is the Least Squares Center (LSC, Gauss). This center is that from which the sum of the squares of the radial ordinates of the measured polar profile has a minimum value.

The offset may include an amplitude constant and wherein the amplitude constant may be ≥0.03% of a diameter of the cylinder bore 120. The variation in geometry around the circumference of a piston may be modeled by a general Fourier series for the entirety of the land or for sections of the land by piecewise Fourier series:

$$R(\phi) = \sum_{i=0}^{i=n} (A_i \cos(i\phi) + \varphi)$$

R(ϕ)=radial coordinate
ϕ=angular coordinate
φ=angular offset
$A_i$=amplitude constant
i=order represented as a set of integers
n=highest order to be considered The use of the offset 250 of the piston 110 towards the thrust side 230 or antithrust side 240 thus reduces the clearance between the piston top land 140 and the liner 130 in one direction or the other. As described above, this clearance may be a crevice volume that negatively impacts hydrocarbon emissions. Additional clearance also may allow for localized hot spots on the piston 110 that may cause carbon deposits to form over time. Carbon deposits may be undesirable because they can lead to conditions such as carbon raking or bore polishing that adversely affect the power cylinder performance. The offset 240 also may reduce wear on the top land 140 and/or the second land 150 in the thrust direction which negatively impacts friction and reduces bottom-end overhaul life.

When the piston 110 thrusts due to combustion pressure, the reciprocating nature of the piston causes secondary motion of the piston 110 into the direction of the liner 130 (i.e., perpendicular) as opposed to parallel to the primary direction of travel for useful mechanical work generation. This secondary thrust motion may cause reduced clearance on one side of the piston (the thrust side 230) leading to wear and increase clearance on the opposite side of the piston (the antithrust side 240) and an increasing crevice volume. Moreover, against additional crevice volume from thermal deformations (of the piston (like from an asymmetric combustion bowl) or liner (cylinder head intake/exhaust position or varying jacket water cooling) respectively). Also, non-uniform assembly loading of any of the system components, especially the cylinder head. Additional clearance may have negative consequences of increased hydrocarbon contributions due to crevice volumes for unburned fuel and the ability for oil to be exposed to hotter combustion temperatures and for hard carbon deposits. Implementing the offset 240 to the tight land profile 225 enables improved crevice volume control and minimizes wear on the top and/or the second land.

A tight piston profile is defined as having a land diametral cold (i.e., room temperature) clearance of less than 0.46% of the nominal bore diameter for aluminum pistons in a lean burn engine. The tight piston profile for an aluminum piston in a stoichiometric burn engine would have a diametral cold clearance of less than 0.53% of the nominal bore diameter. A tight piston profile is defined as having a land diametral cold of less than 0.29% of the nominal bore diameter for steel pistons in a lean burn engine. The tight piston profile for a steel piston in a stoichiometric burn engine would have a diametral cold clearance of less than 0.33% of the nominal bore diameter. The cold clearances should be tight enough to provide a minimum clearance preferably between 0 microns and 35 microns and more preferably between 5 microns and 25 microns radially when the engine operates at rated temperatures. Clearances will vary during engine operation due to piston secondary motion, piston thermal, pressure, and inertial distortions, and bore distortions both circumferentially and axially for the liner.

Moreover, the clearance needs to be reduced in a simple geometric manner so as to reduce manufacturing complexity, to be robust in cylinder-to-cylinder variations (of pistons, liners, etc.), and to reduce the amount of metal-to-metal asperity contact to avoid undo frictional losses. The ability to effectively and simply reduce hydrocarbon emissions and carbon deposits directly leads to the ability of engines with this technology to meet or maintain hydrocarbon emissions targets and increase cylinder robustness, i.e., longevity of service before requiring retrofit or overhaul maintenance/replacement. The offset 240 thus makes use of the simple geometry construct of the piston shape to address the issue of crevice volume and carbon deposits It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A piston assembly, comprising:
   a cylinder bore;
   the cylinder bore extending from a thrust side to an antithrust side; and
   a piston positioned within the cylinder bore, wherein the piston is configured to move in an axial direction within the cylinder bore;
   the piston comprising a top land and a second land;
   the piston comprising a skirt with a central skirt axis therethrough;
   the piston comprising a tight land profile of the top land and/or the second land with a central land axis therethrough, wherein the tight land profile has a minimum clearance of 0 to 35 microns between the cylinder bore and the top land and/or the second land during rated operating temperatures; and
   the tight land profile comprising an offset of the central land axis away from the central skirt axis toward the antithrust side, wherein the central skirt axis and the central land axis extend in the axial direction.

2. The piston assembly of claim 1, wherein the top land comprises the offset of the central land axis of the top land away from the central skirt axis of the skirt toward the antithrust side.

3. The piston assembly of claim 1, wherein the second land comprises the offset of the central land axis of the second land away from the central skirt axis of the skirt toward the antithrust side.

4. The piston assembly of claim 1, wherein at least one of the top land or the second land is defined as an ellipse with an ellipse axis as the central land axis.

5. The piston assembly of claim 4, wherein the offset comprises an amplitude constant and wherein the amplitude constant comprises ≥0.03% of a diameter of the cylinder bore.

6. The piston assembly of claim 5, wherein the ellipse comprises a circle.

7. The piston assembly of claim 1, wherein both the top land and the second land have the tight land profile.

8. The piston assembly of claim 1, wherein the cylinder bore comprises a liner.

9. The piston assembly of claim 1, wherein the piston comprises a top ring groove between the top land and the second land.

10. The piston assembly of claim 9, wherein the piston comprises a top ring in the top ring groove.

11. The piston assembly of claim 1, wherein the piston comprises a third land, the piston comprises a second ring groove between the second land and the third land, and the piston comprises a second ring in the second ring groove.

12. A piston assembly for a power generation system, comprising:
    a cylinder liner;
    the cylinder liner extending from a thrust side to an antithrust side; and
    a piston positioned within the cylinder liner, wherein the piston is configured to move in an axial direction within the cylinder liner;
    the piston comprising a skirt, a top land, and a second land; and
    the top land and/or the second land comprising a central land axis offset away from a central skirt axis of the skirt towards the antithrust side, wherein the central skirt axis and the central land axis extend in the axial direction.

13. The piston assembly of claim 12, wherein at least one of the top land or the second land is defined as an ellipse having the central land axis as an ellipse axis.

14. A system, comprising:
    a piston configured to mount in a cylinder bore of an engine, wherein the piston comprises:
        a skirt disposed about a central skirt axis;
        a land disposed about a central land axis;
        a ring groove disposed adjacent the land, wherein the central land axis is offset away from the central skirt axis toward the antithrust side to position the land off center relative to the cylinder bore such that the land is positioned closer to the antithrust side and further from the thrust side, and the central skirt axis and the central land axis extend in an axial direction along an axial path of travel of the piston in the cylinder bore.

15. The system of claim 14, wherein the land is defined as an ellipse having an ellipse axis as the land axis.

16. The system of claim 14, wherein the land comprises a tight land profile relative to the cylinder bore of the engine, wherein the tight land profile has a minimum clearance of 0 to 35 microns between the cylinder bore and the land during rated operating temperatures of the engine.

17. The system of claim 14, wherein the piston comprises a plurality of lands including the land, the plurality of lands define a plurality of ring grooves including the ring groove, and each land of the plurality of lands has the central land axis offset away from the central skirt axis toward the antithrust side to position the respective land off center relative to the cylinder bore such that the land is positioned closer to the antithrust side and further from the thrust side.

18. The system of claim 14, comprising the engine having the piston.

* * * * *